United States Patent
Aoki

(10) Patent No.: US 11,431,948 B2
(45) Date of Patent: Aug. 30, 2022

(54) POSITION AND SIZE ADJUSTMENT SUPPORT METHOD AND POSITION AND SIZE ADJUSTMENT SUPPORT DEVICE FOR DISPLAY APPRATUS AND IMAGING APPRATUS

(71) Applicant: Panasonic Intellectual Property Management Co., Ltd., Osaka (JP)

(72) Inventor: Asuka Aoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/149,316

(22) Filed: Jan. 14, 2021

(65) Prior Publication Data

US 2021/0227188 A1 Jul. 22, 2021

(30) Foreign Application Priority Data

Jan. 20, 2020 (JP) .............................. JP2020-006862

(51) Int. Cl.
*H04N 9/31* (2006.01)

(52) U.S. Cl.
CPC ......... *H04N 9/3191* (2013.01); *H04N 9/3185* (2013.01); *H04N 9/3188* (2013.01)

(58) Field of Classification Search
CPC .. H04N 9/3147; H04N 9/3185; H04N 9/3188; H04N 9/3191; H04N 9/3194; G06F 1/1639; G06F 3/0425

See application file for complete search history.

(56) References Cited

U.S. PATENT DOCUMENTS

| 2010/0066865 | A1  | 3/2010 | Sakamoto |              |
|--------------|-----|--------|----------|--------------|
| 2011/0058109 | A1* | 3/2011 | Nishigaki | H04N 9/3129 |
|              |     |        |           | 348/744      |
| 2014/0253693 | A1* | 9/2014 | Shikata   | H04N 1/2112  |
|              |     |        |           | 348/47       |

(Continued)

FOREIGN PATENT DOCUMENTS

| JP | 2009-130592 | 6/2009 |
| JP | 2010-74264  | 4/2010 |

(Continued)

*Primary Examiner* — Paulos M Natnael

(74) *Attorney, Agent, or Firm* — Wenderoth, Lind & Ponack, L.L.P.

(57) ABSTRACT

A position and size adjustment support method supports an adjustment work to achieve a predetermined position and size relation between a display range of a display apparatus and a shooting range of an imaging apparatus. An image of at least a part of the display range is shot by the imaging apparatus. A position and size relation between the display range and the shooting range is calculated based on the image. At least one of a moving direction and a size change direction of at least one of the display range and the shooting range is calculated, based on the position and size relation calculated, the moving direction and the size change direction being used to change the position and size relation to the predetermined position and size relation. Adjustment guide information providing with the at least one of the moving direction and the size change direction calculated is output.

9 Claims, 15 Drawing Sheets

(56) References Cited

U.S. PATENT DOCUMENTS

| | | | | |
|---|---|---|---|---|
| 2016/0119602 A1* | 4/2016 | Yushiya | ................. | G03B 21/00 |
| | | | | 348/745 |
| 2017/0140566 A1* | 5/2017 | Ishikawa | ................... | G06T 7/70 |
| 2018/0183993 A1* | 6/2018 | Kobayashi | ....... | H04N 5/232933 |
| 2019/0037143 A1* | 1/2019 | Tsubusaki | ........ | H04N 5/232123 |
| 2019/0361332 A1 | 11/2019 | Kurota | | |
| 2019/0385272 A1* | 12/2019 | Aoki | ......................... | G06T 7/70 |

FOREIGN PATENT DOCUMENTS

| | | |
|---|---|---|
| JP | 2013-254324 | 12/2013 |
| JP | 2016-149618 | 8/2016 |
| JP | 2019-207392 | 12/2019 |
| WO | 2013/183237 | 12/2013 |

* cited by examiner

POSITION AND SIZE ADJUSTMENT SUPPORT METHOD AND POSITION AND SIZE ADJUSTMENT SUPPORT DEVICE FOR DISPLAY APPRATUS AND IMAGING APPRATUS

BACKGROUND

1. Technical Field

The present disclosure relates to a position and size adjustment support method and support device that support operator's adjustment work to achieve a predetermined positional relation and a predetermined size relation between a display range of a display apparatus and a shooting range of an imaging apparatus.

2. Description of the Related Art

Patent Literature (PTL) 1 discloses a system in which a projection display apparatus (projector) projects a frame-like range specification image onto a subject, and a camera shoots the subject onto which the range specification image is projected. The system identifies a position of the range specification image in a shot image, and adjusts an imaging direction and zoom magnification of the camera based on the identified position so that camera's shooting range comes within the range specification image.

PTL 1 is Unexamined Japanese Patent Publication No. 2010-74264.

SUMMARY

The system in PTL 1 is limited to an imaging apparatus configured such that the imaging direction or zoom magnification can be changed according to an external signal. In other words, the system is not capable of adjusting a position or size of a shooting range of an imaging apparatus having specifications of manually adjusting the imaging direction or zoom magnification by a user.

It is an object of the present disclosure to adjust a display range of a display apparatus and a shooting range of an imaging apparatus to achieve a predetermined position and size relation, regardless of specifications of the imaging apparatus.

To achieve the object, one embodiment of the present disclosure provides a position and size adjustment support method of supporting an adjustment work by an operator to achieve a predetermined position and size relation between a display range of a display apparatus and a shooting range of an imaging apparatus. An image of at least a part of the display range is shot by the imaging apparatus. A position and size relation between the display range and the shooting range is calculated based on the image shot by the imaging apparatus. At least one of a moving direction and a size change direction of at least one of the display range and the shooting range is calculated, based on the position and size relation calculated, the moving direction and the size change direction being used to change the position and size relation between the display range and the shooting range to the predetermined position and size relation. Adjustment guide information is created and output to provide the operator with the at least one of the moving direction and the size change direction calculated.

Another embodiment of the present disclosure provides a position and size adjustment support device that supports an adjustment work by an operator to achieve a predetermined position and size relation between a display range of a display apparatus and a shooting range of an imaging apparatus. The support device includes a storage for storing a program, and a controller for controlling the position and size adjustment support device by executing the program. The controller obtains an image shot by the imaging apparatus, the image including at least a part of the display range of the display apparatus, calculates a position and size relation between the display range and the shooting range based on the image shot, calculates at least one of a moving direction and a size change direction of at least one of the display range and the shooting range, based on the position and size relation calculated, the moving direction and the size change direction being used to change the position and size relation between the display range and the shooting range to the predetermined position and size relation, and creates and outputs adjustment guide information providing the operator with the at least one of the moving direction and the size change direction calculated.

The present disclosure enables to adjust the display range of the display apparatus and the shooting range of the imaging apparatus to achieve the predetermined positional relation and the predetermined size relation between the display range and the shooting range, regardless of specifications of the imaging apparatus.

DETAILED DESCRIPTION

Figure 1:
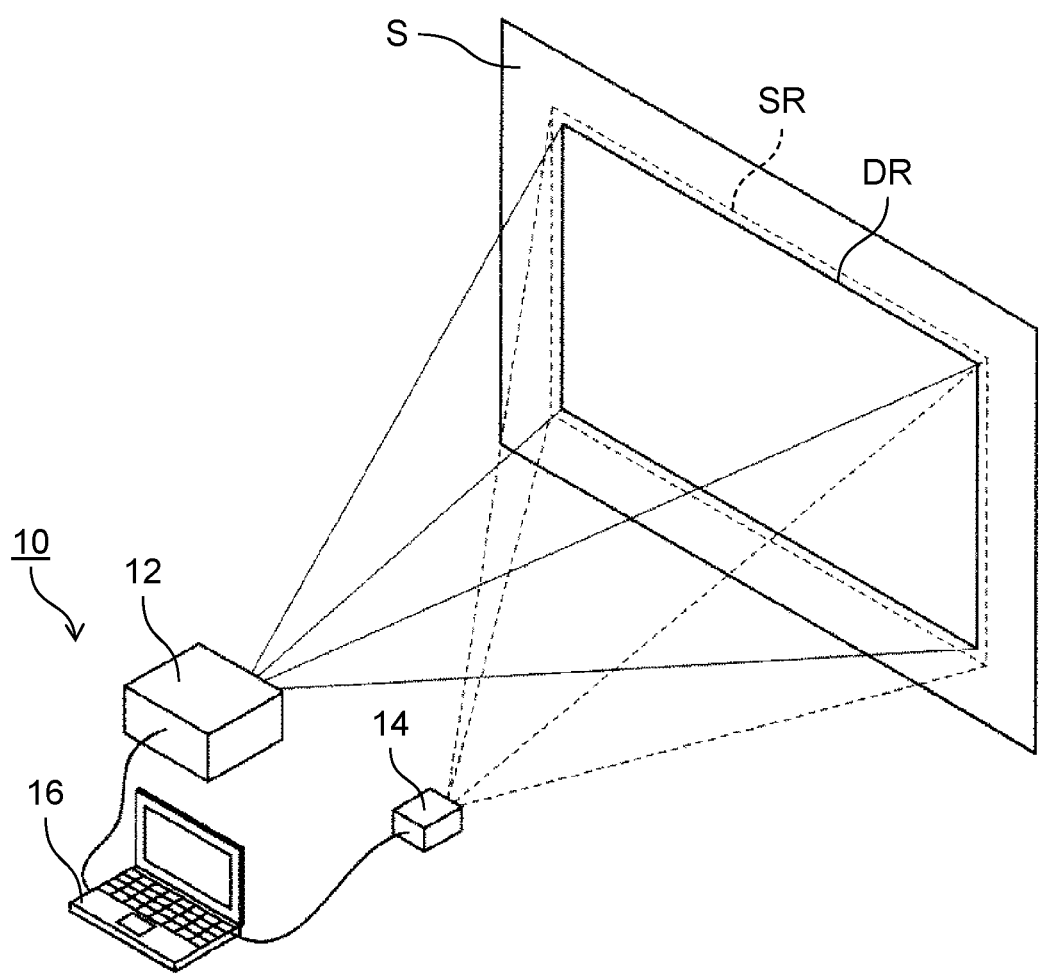
FIG. 1 is a schematic view of a position and size adjustment support system that supports an operator who adjusts a position and size of a display range of a display apparatus and a shooting range of an imaging apparatus in accordance with a first exemplary embodiment.

A position and size adjustment support method in an embodiment of the present disclosure supports an adjustment work by an operator to achieve a predetermined position and size relation between a display range of a display apparatus and a shooting range of an imaging apparatus. At least a part of the display range is shot by the imaging apparatus. A position and size relation between the display range and the shooting range is calculated based on an image shot by the imaging apparatus. At least one of a moving direction and a size change direction of at least one of the display range and the shooting range is calculated, based on the position and size relation calculated, the moving direction and the size change direction being used to change the position and size relation between the display range and the shooting range to the predetermined position and size relation. Adjustment guide information is created and output to provide the operator with the at least one of the moving direction and the size change direction calculated.

This embodiment enables to adjust the display range of the display apparatus and the shooting range of the imaging apparatus to achieve the predetermined positional relation and the predetermined size relation, regardless of specifications of the imaging apparatus.

For example, an adjustment guide image is created as the adjustment guide information, and the display apparatus may be display the adjustment guide image.

For example, at least one of a moving amount and a size change amount of at least one of the display range and the shooting range is calculated, based on the position and size relation calculated, the moving amount and the size change amount being used to change the position and size relation between the display range and shooting range to the predetermined position and size relation, and the information guide image may be created to provide the operator with the at least one of the moving amount and the size change amount calculated.

For example, when the position and size relation between the display range and the shooting range changes by the adjustment work, the adjustment guide image may be updated based on the changed position and size relation.

For example, when the display range and the shooting range satisfy the predetermined position and size relation by the adjustment work, the display apparatus may display an adjustment completion image to inform completion of adjustment.

For example, a pattern image is displayed in the display range, and when a part of the pattern image is present outside the shooting range, the part of the pattern image present outside the shooting range and a remaining part inside the shooting range may be displayed a visually distinguishable manner.

For example, when the display range and the shooting range satisfy the predetermined position and size relation, a whole of the display range may be included in the shooting range.

For example, when the display range and the shooting range satisfy the predetermined position and size relation, a center of the shooting range and a center of the display range may be matched, and an area of the display range may be a predetermined percentage of an area of the shooting range.

For example, the display apparatus may be a projection display apparatus that projects an image. In this case, the display range is a projection range for projecting the image.

Another embodiment of the present disclosure provides a position and size adjustment support device that supports an adjustment work by an operator to achieve a predetermined position and size relation between the display range of the display apparatus and the shooting range of the imaging apparatus. The position and size adjustment support device includes a storage that stores a program, and a controller that controls the position and size adjustment support device by executing the program. The controller obtains an image shot by the imaging apparatus. The image including at least a part of the display range of the display apparatus. The controller then calculates a position and size relation between the display range and the shooting range based on the image shot. The controller then calculates at least one of a moving direction and a size change direction of at least one of the display range and the shooting range, based on the position and size relation calculated, the moving direction and the size change direction being used to change the position and size relation between the display range and the shooting range to the predetermined position and size relation. The controller then creates and outputs adjustment guide information to provide the operator with the at least one of the moving direction and the size change direction calculated.

These embodiments enable to adjust the display range of the display apparatus and the shooting range of the imaging apparatus to achieve the predetermined positional relation and the predetermined size relation between the display range and the shooting range, regardless of specifications of the imaging apparatus.

Exemplary embodiments of the present disclosure are described below with reference to drawings.

First Exemplary Embodiment

Figure 2:
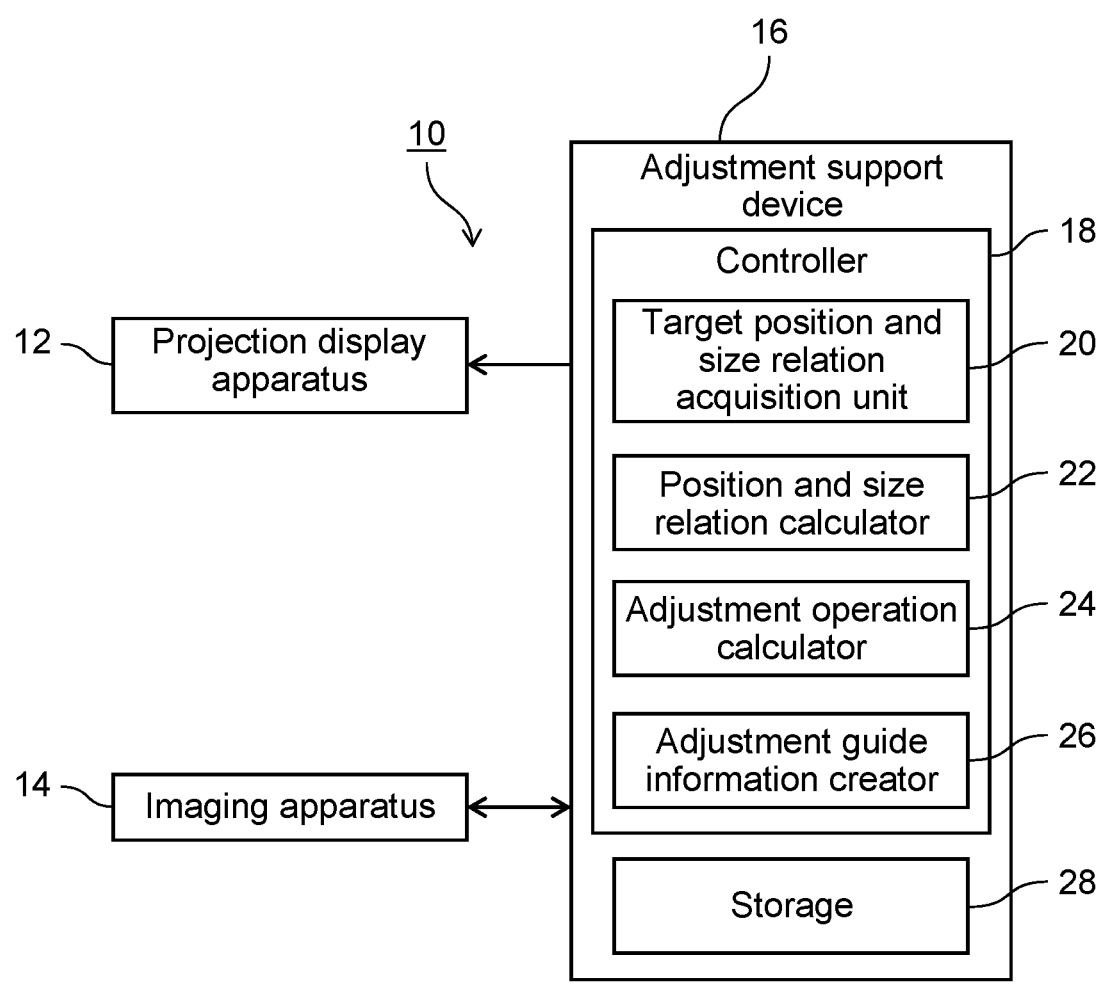
FIG. 2 is a block diagram illustrating a configuration of the position and size adjustment support system.

FIG. 1 is a schematic view of a position and size adjustment support system that supports an operator to adjust a position and size relation between a display range of a display apparatus and a shooting range of an imaging apparatus in the first exemplary embodiment. FIG. 2 is a block diagram of a configuration of the position and size adjustment support system.

Position and size adjustment support system 10 in FIG. 1 includes projection display apparatus 12, imaging apparatus 14, and adjustment support device (support device) 16 connected to these apparatuses. Position and size adjustment support system 10, i.e., adjustment support device 16, is configured to support operator's work to adjust display range DR of projection display apparatus 12 and shooting range SR of imaging apparatus 14 to achieve a target positional relation (i.e., predetermined positional relation) and a target size relation (i.e., predetermined size relation). Hereinafter, the positional relation and size relation are referred to as the position and size relation.

Projection display apparatus 12 is, for example, a projector to project an image onto screen S. Display range DR of projection display apparatus 12 is equivalent to a projection range in which an image can be projected. In the first exemplary embodiment, projection display apparatus 12 is installed in an appropriate position in advance, and its projecting direction and zoom magnification are already appropriately adjusted.

Imaging apparatus 14 is, for example, a camera. It is an apparatus for shooting an image projected and displayed on screen S by projection display apparatus 12. Imaging apparatus 14 is used, for example, for monitoring an image or adjusting a picture quality of an image projected by projection display apparatus. Unlike projection display apparatus 12, imaging apparatus 14 is installed in a provisional position by the operator in the first exemplary embodiment.

In the first exemplary embodiment, as described above, projection display apparatus 12 is already installed in the appropriate position but imaging apparatus 14 is installed in the provisional position. Therefore, as an adjustment work, the operator first adjusts the imaging direction and zoom magnification of imaging apparatus 14. A position at which the imaging direction and zoom magnification are appropriately adjusted is an appropriate position for imaging apparatus 14.

More specifically, as operator's adjustment work to achieve a target (predetermined) position and size relation between display range (projection range) DR of projection display apparatus 12 and shooting range SR of imaging apparatus 14, an adjustment is made to include entire display range DR in shooting range SR (adjustment of the imaging direction and zoom magnification of imaging apparatus 14).

Figure 3A:
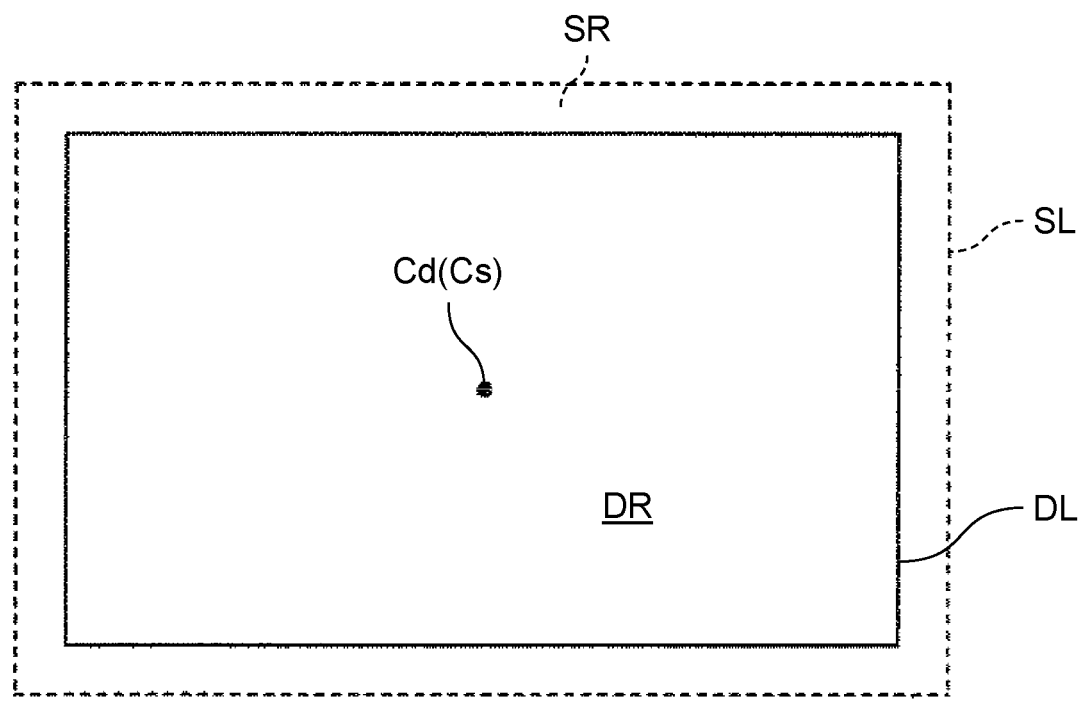
FIG. 3A is an example of a predetermined position and size relation between the display range of the display apparatus and the shooting range of the imaging apparatus.
Figure 3B:
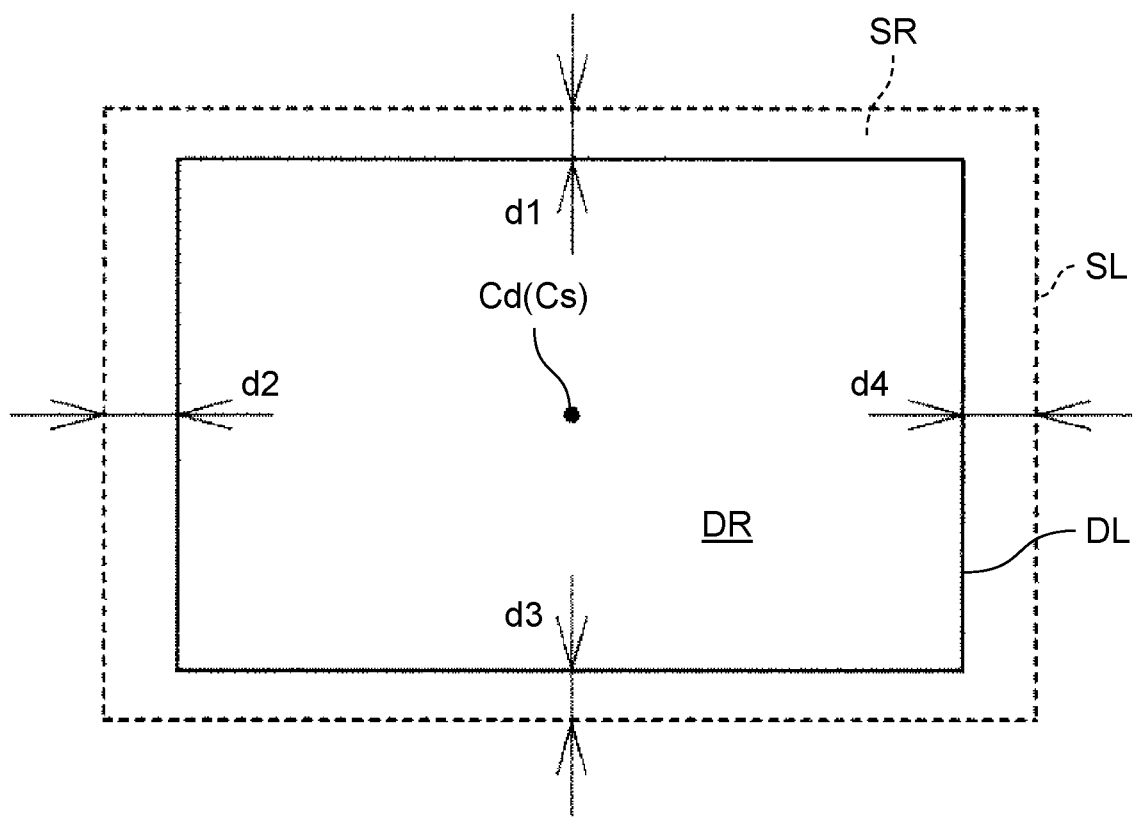
FIG. 3B is another example of the predetermined position and size relation between the display range of the display apparatus and the shooting range of the imaging apparatus.

FIG. 3A is an example of the predetermined position and size relation between the display range of the display apparatus and the shooting range of the imaging apparatus. FIG. 3B shows another example of the predetermined position and size relation between the display range of the display apparatus and the shooting range of the imaging apparatus.

In the first exemplary embodiment, and more specifically as shown in FIG. 3A, an adjustment is made to match center Cs of shooting range SR and center Cd of display range DR, and also to achieve an area of display range DR having a predetermined percentage (e.g., 80%) of an area of shooting range SR. Instead of adjustment with respect to area, an adjustment may be made to achieve the predetermined number of pixels (e.g., 20 to 40 pixels) in distances d1 to d4 between outline DL of display range DR and outline SL of shooting range SR. These distances d1 to d4 may be same or different.

Adjustment support device 16 in position and size adjustment support system 10 that supports operator's adjustment work as described above is, for example, configured with a lap-top PC (personal computer) as shown in FIG. 1. The PC functions as adjustment support device 16 by installing a program.

To support operator's adjustment work, adjustment support device 16 is connected to projection display apparatus 12 and imaging apparatus 14 via wired or wireless communication.

As shown in FIG. 2, adjustment support device 16 includes controller 18 and storage 28. Controller 18 includes target position and size relation acquisition unit 20, position and size relation calculator 22, adjustment operation calculator 24, and adjustment guide information creator 26. When adjustment support device 16 is configured with PC, as mentioned above, PC's CPU (controller 18) operates according to a program stored in a storage device (storage 28), such as a hard disk, to function as target position and size relation acquisition unit 20, position and size relation calculator 22, adjustment operation calculator 24, and adjustment guide information creator 26.

Target position and size relation acquisition unit 20 obtains information on a target position and size relation (i.e., predetermined position and size relation) desired by the operator, with respect to the position and size relation between display range DR and shooting range SR. For example, when adjustment support device 16 is configured with a lap-top PC, the information on position and size relation desired by the operator is obtained via keyboard of the lap-top PC or an input device, such as a mouse, connected to the lap-top PC. For example, a plurality of options for position and size relation information are displayed on a display of the lap-top PC, and the operator selects one of the options for position and size relation information using the mouse. The operator also inputs a numerical value, via keyboard, for a ratio of the area of display range DR to the area of shooting range SR.

When the adjustment support device has, for example, a built-in computing board but is not equipped with a display, information required for adjustment work may be projected on screen S by projection display apparatus 12. The operator looks at the screen to perform adjustment work by operating the keyboard or mouse connected to the adjustment support device.

Position and size relation calculator 22 calculates the position and size relation between display range DR of projection display apparatus 12 and shooting range SR of imaging apparatus 14. This position and size relation is calculated based on an image shot by imaging apparatus 14.

First, as preparation, projection display apparatus 12 projects predetermined pattern image Pi spreading over entire display range DR (FIG. 4) so that the operator can visually recognize this display range DR. Then, the operator adjusts imaging apparatus 14 to face this visualized display range DR (i.e., pattern image Pi).

After the preparation, imaging apparatus 14 shoots visualized display range DR (pattern image Pi). Adjustment support device 16 obtains the shot image at least including a part of this display range DR from imaging apparatus 14.

Figure 4:
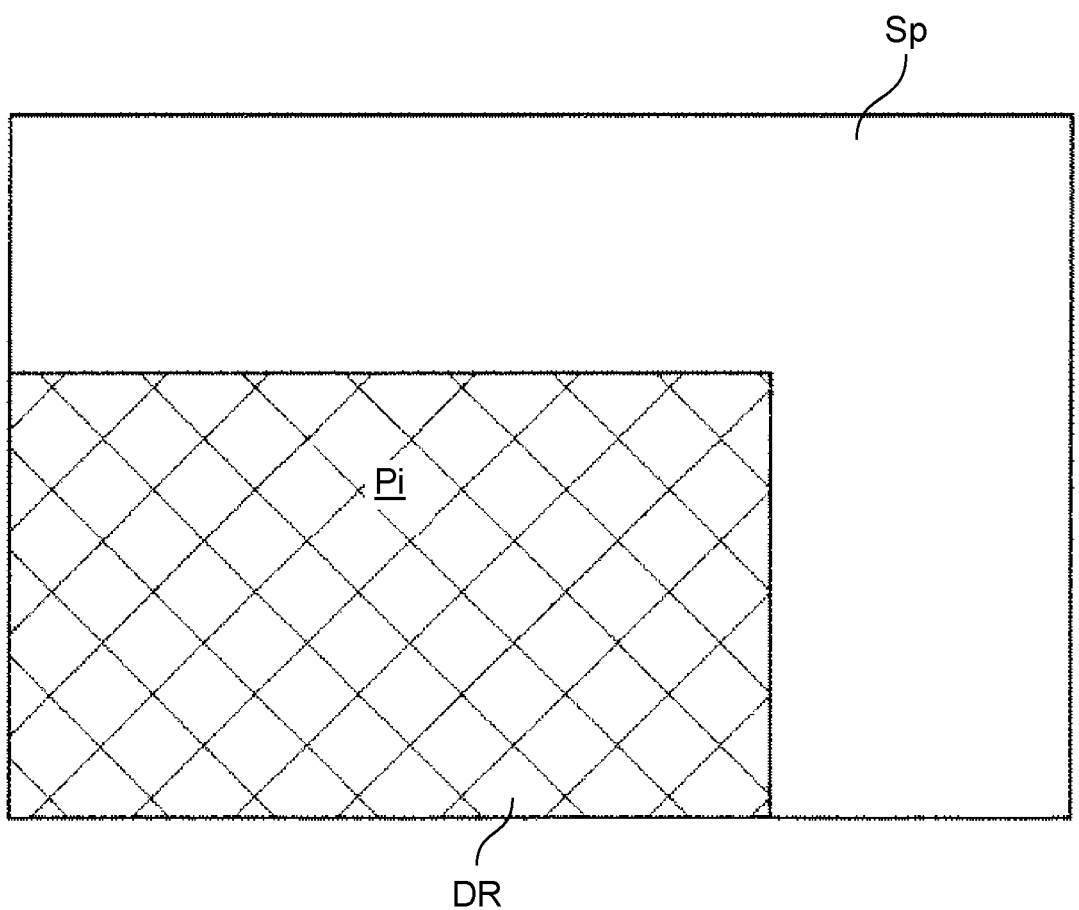
FIG. 4 is an example of an image shot by the imaging apparatus in which a part of the display range of the display apparatus is included.
Figure 5:
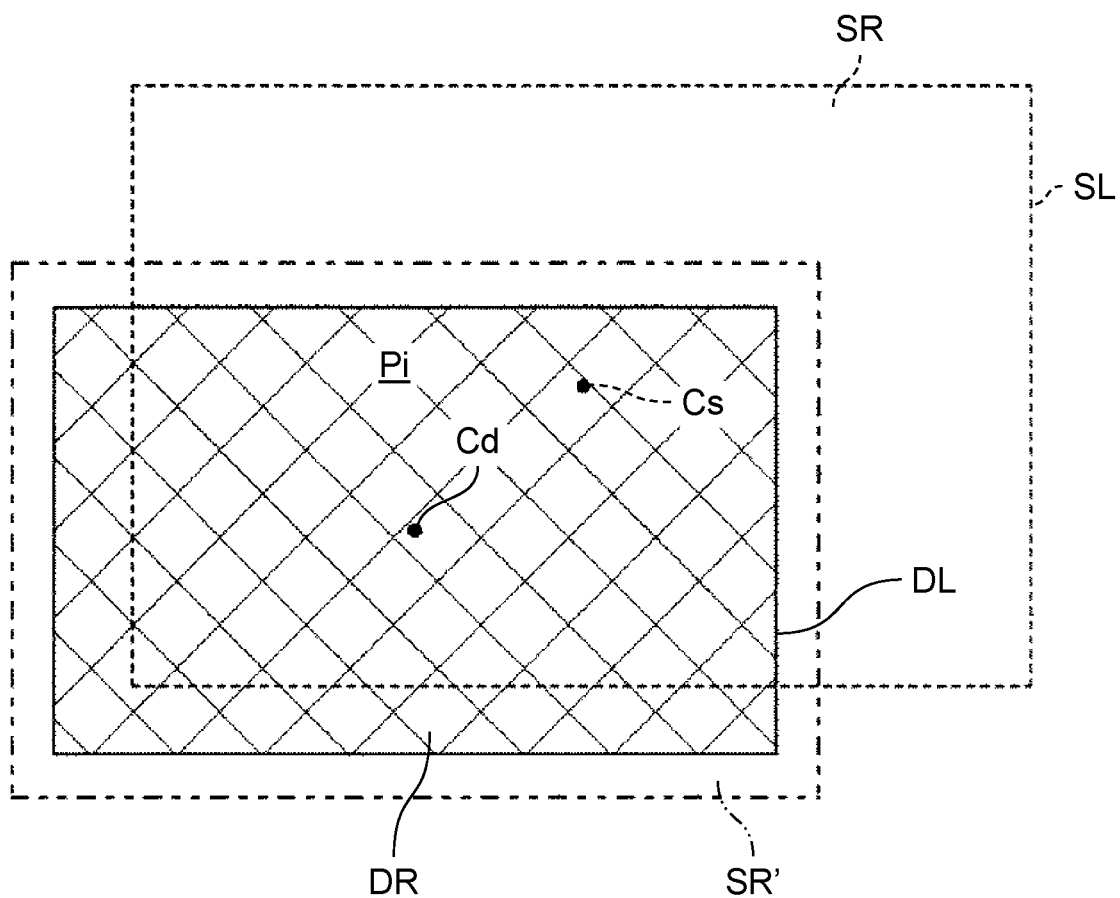
FIG. 5 illustrates a position and size relation between the display range of the display apparatus and the shooting range of the imaging apparatus when the image in FIG. 4 is shot.

FIG. 4 is an example of the image shot by the imaging apparatus, including a part of the display range of the display apparatus. FIG. 5 shows the position and size relation between the display range of the display apparatus and the shooting range of the imaging apparatus when the image shown in FIG. 4 is shot.

As shown in FIG. 4, shot image Sp by imaging apparatus 14 includes a part of visualized display range DR (a part of pattern image Pi). In other words, as shown in FIG. 5, a portion of display range DR present in shooting range SR of imaging apparatus 14 is included in shot image Sp. In FIG. 5, a two-dot chain line indicates target shooting range SR' when display range DR and shooting range SR satisfy the predetermined position and size relation.

Based on shot image Sp including pattern image Pi, position and size relation calculator 22 of adjustment support device 16 calculates a position and size relation between display range DR of projection display apparatus 12 and shooting range SR of imaging apparatus 14. More specifically, image processing is applied to shot image Sp to extract at least a part of display range DR, i.e., a part of pattern image Pi, from shot image Sp. Pattern image Pi has patterns that enable to obtain a correspondence relation between display range DR of projection display apparatus 12 and shooting range SR of imaging apparatus 14 (for example, a correspondence relation between pixels of projection display apparatus 12 and pixels of imaging apparatus 14). Pattern image Pi may have one type of pattern or a combination of several different types of patterns.

As the position and size relation, position and size relation calculator 22 calculates, for example, a direction and amount of deviation of center Cd of display range DR from center Cs (shape center) of shooting range SR, and an area ratio of display range to shooting range SR, based on pattern image Pi extracted from shot image Sp.

While the operator adjusts display range DR of projection display apparatus 12 and shooting range SR of imaging apparatus 14 to achieve the target (predetermined) position and size relation, position and size relation calculator 22 calculates the position and size relation periodically. Calculation of the position and size relation continues until the position and size relation between display range DR of projection display apparatus 12 and shooting range SR of imaging apparatus 14 achieves the target (predetermined) position and size relation.

Adjustment operation calculator 24 calculates at least a moving direction or size change direction of shooting range SR as an adjustment operation for changing display range DR and shooting range SR to achieve the target (predetermined) position and size relation obtained by target position and size relation acquisition unit 20. The calculation is performed based on the position and size relation between display range DR of projection display apparatus 12 and shooting range SR of imaging apparatus calculated by position and size relation calculator 22. Here, the size change direction refers to magnification or reduction of size.

For example, in the case shown in FIG. 5, center Cd of display range DR is located at the lower left relative to center Cs of shooting range SR. In addition, shooting range SR is large relative to display range DR, compared with target shooting range SR' (two-dot chain line) that achieves the target (predetermined) position and size relation. In this case, adjustment operation calculator 24 calculates the downward left direction as the moving direction of shooting range SR and also reduction as the size change direction of shooting range SR.

Adjustment guide information creator 26 creates adjustment guide information for guiding an adjustment work, in order to support the operator's adjustment work to achieve the target (predetermined) position and size relation between display range DR of projection display apparatus 12 and shooting range SR of imaging apparatus 14. The adjustment guide information is information on adjustment operation calculated by adjustment operation calculator 24, and is provided to the operator.

In the first exemplary embodiment, adjustment guide information creator 26 provides the adjustment guide information in the form of image, i.e., adjustment guide image, to the operator. This adjustment guide image is displayed by projection display apparatus 12 (projected on screen 5).

Figure 6A:
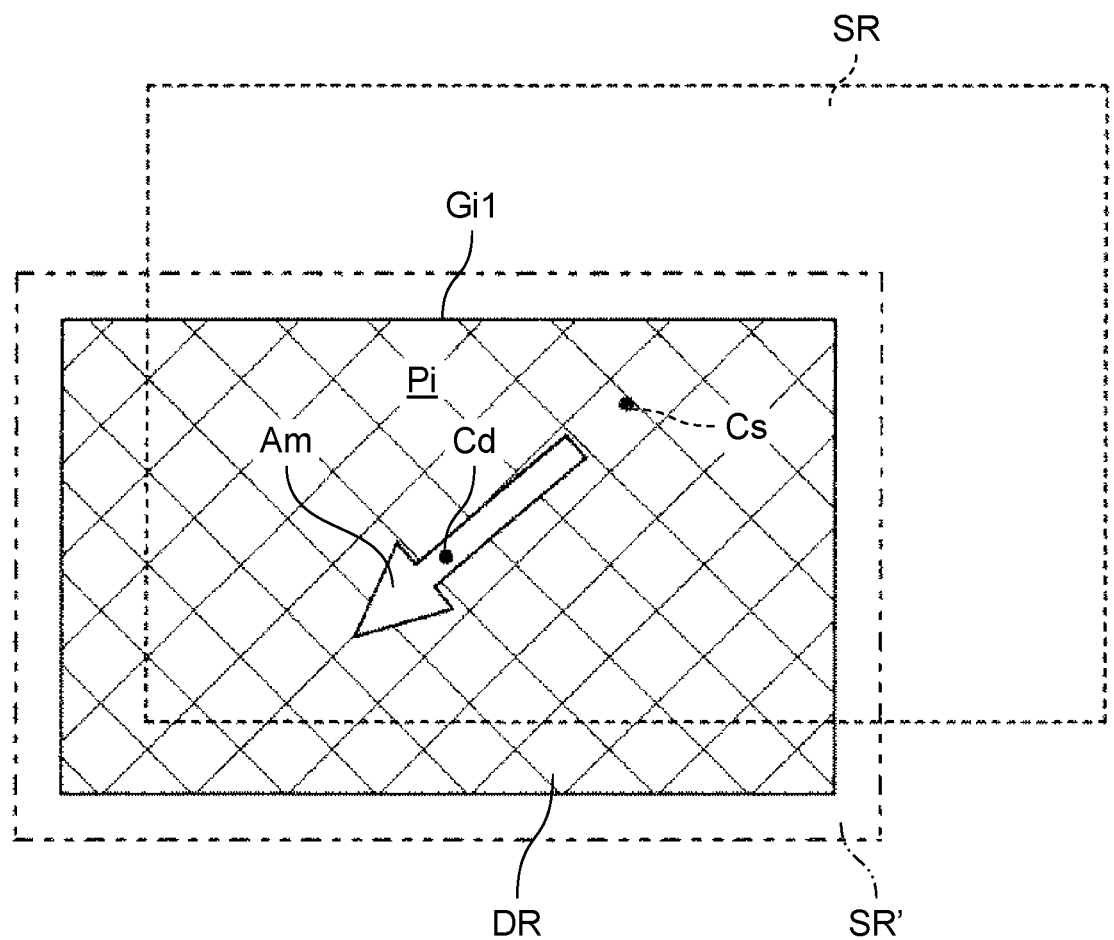
FIG. 6A is an example of adjustment guide information provided to an operator in a form of image.
Figure 6B:
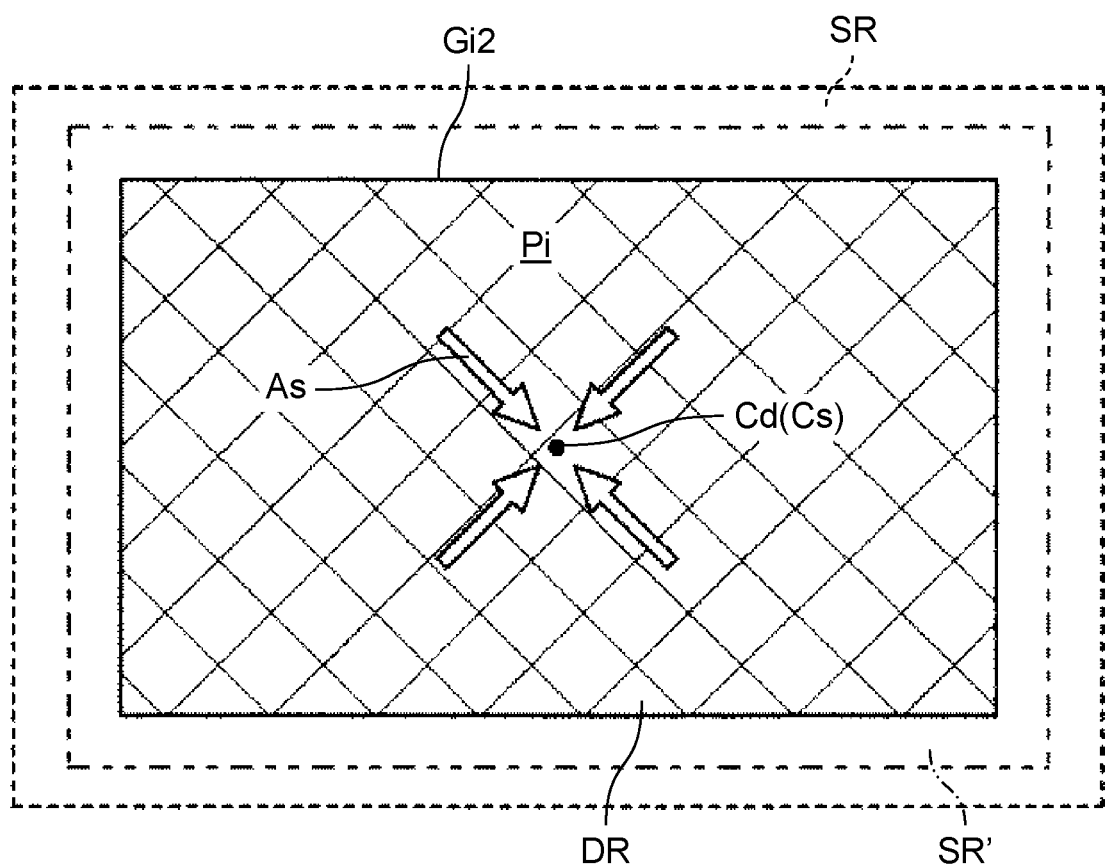
FIG. 6B is another example of adjustment guide information provided to an operator in a form of image.

FIG. 6A is an example of the adjustment guide information provided to the operator in the form of image. FIG. 6B is another example of the adjustment guide information provided to the operator in the form of image.

As shown in FIG. 6A, adjustment guide information creator 26 creates adjustment guide image Gi1 to show the operator the moving direction of shooting range SR, i.e., the moving direction to match center Cs of shooting range SR to center Cd of display range DR. In the example shown in FIG. 6A, adjustment guide image Gi1 including arrow Am toward the bottom left is created to show the operator the adjustment work to adjust the imaging direction of imaging apparatus 14 in a way such that shooting range SR is moved in the lower left direction.

In the first exemplary embodiment, adjustment guide image Gi1 is configured with arrow Am indicating the moving direction of shooting range SR overlapped on pattern image Pi that position and size relation calculator 22 uses for calculating the position and size relation. Accordingly, adjustment guide image Gi1 is used for calculating the position and size relation and also shows the moving direction of shooting range SR to the operator.

Still more, adjustment guide information creator 26 creates adjustment guide image G12 for indicating the size change direction of shooting range SR, as shown in FIG. 6B. This adjustment guide image Gi2 is created after shooting range SR satisfies the predetermined positional relation relative to display range DR (after center Cs of shooting range is matched with center Cd of display range DR). In the example shown in FIG. 6B, adjustment guide image Gi2 including a plurality of arrows As directed toward the center is created, in order to show the operator to adjust zoom magnification of imaging apparatus 14 in a way such that shooting range Sr is reduced.

In the first exemplary embodiment, adjustment guide image Gi2 is configured with arrows As indicating the size change direction of shooting range SR overlapped on pattern image Pi that position and size relation calculator 22 uses for calculating the position and size relation. Accordingly, adjustment guide image Gi2 is used for calculating the position and size adjustment and also shows the size change direction of shooting range SR to the operator.

Adjustment guide images Gi1 and Gi2 created by adjustment guide information creator 26 are sent from adjustment support device 16 to projection display apparatus 12, and projection display apparatus 12 projects adjustment guide images Gi1 and Gi2 on screen S.

Adjustment guide images are created intermittently. More specifically, since the position and size relation changes while the operator performs the adjustment work to achieve the target (predetermined) position and size relation between display range DR of projection display apparatus 12 and shooting range SR of imaging apparatus 14, the adjustment guide image is updated according to the changed position and size relation.

A method of showing the operator a movement of shooting range SR or a size change of shooting range SR is not limited to arrows.

For example, with respect to the moving direction to be indicated, an adjustment guide image including an outline of display range DR may be created. Still more, for example, an adjustment guide image that distinguishes a portion of the adjustment guide image corresponding to shooting range SR included in display range DR from other portion of adjustment guide image (e.g., different color or pattern) may be created.

Still more, with respect to the moving direction to be indicated, adjustment guide image Gi1 may, for example, include a marking showing center Cs of shooting range and a marking showing center Cd of display range when center Cs of shooting range SR is located inside display range DR. This enables the operator to know the imaging direction and also an adjustment amount of the imaging direction.

With respect to the size change direction, a grayscale image may be created, for example, as the adjustment guide image whose grayscale changes outward from the center. To show the operator to reduce shooting range SR, the grayscale image whose color becomes lighter outward from the center is created. To show the operator to enlarge shooting range SR, the grayscale image whose color becomes darker outward from the center is created.

Still more, when the target (predetermined) position and size relation is calculated by position and size relation calculator 22, adjustment support device 16 may display by projection display apparatus 12 an adjustment completion image to show the operator that adjustment has been completed.

The configuration of position and size adjustment support system 10 is described up to this point. Now, the operation of position and size adjustment support system 10, i.e., the operation of adjustment support device 16, is described below.

Figure 7:
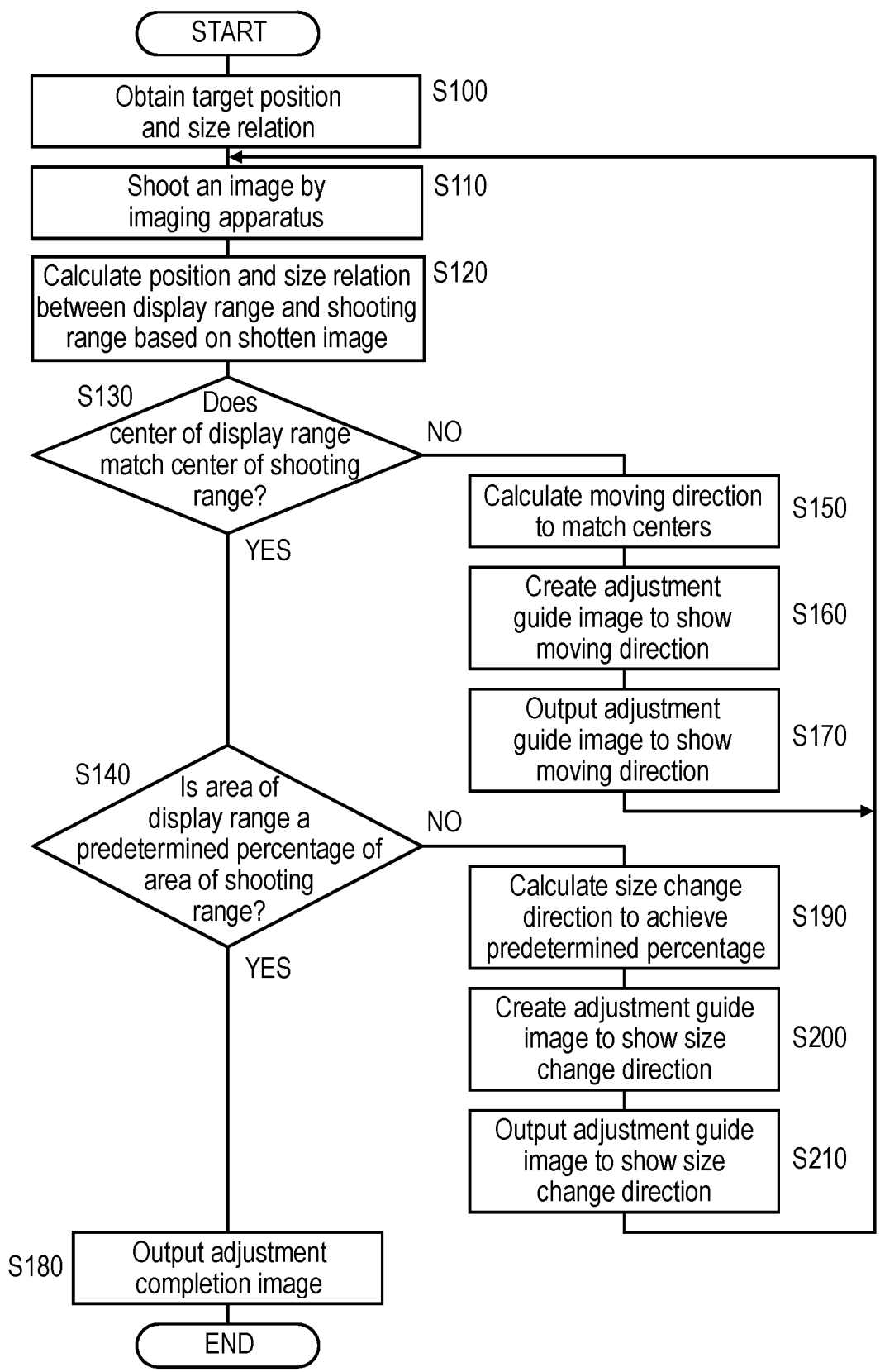
FIG. 7 is a flow chart of an exemplary operation flow of an adjustment support device.

FIG. 7 is a flow chart of an exemplary operation flow of the adjustment support device.

As shown in FIG. 7, in Step S100, adjustment support device 16 (target position and size relation acquisition unit 20) first obtains the target (predetermined) position and size relation between display range DR of projection display apparatus 12 and shooting range SR of imaging apparatus 14 via input by the operator.

Next, in Step S110, imaging apparatus 14 shoots an image. As a result, shot image Sp including at least a part of display range DR of projection display apparatus 12, as shown in FIG. 4, is created.

Then, in Step S120, adjustment support device 16 (position and size relation calculator 22) calculates a position and size relation between display range DR of projection display apparatus 12 and shooting range SR of imaging apparatus 14, based on shot image Sp created in Step S110.

In Step S130, adjustment support device 16 determines whether center Cd of display range DR of projection display apparatus 12 is matched with center Cs of shooting range SR of imaging apparatus 14, based on the position and size relation calculated in Step S120. When the centers are matched, adjustment support device 16 proceeds to Step 140, and if not, to Step S150.

When adjustment support device 16 determines that center Cd of display range DR of projection display apparatus 12 is not matched with center Cs of shooting range SR of imaging apparatus 14 in Step S130, adjustment support device 16 (adjustment operation calculator 24) calculates the moving direction of shooting range SR, i.e., the moving direction to match center Cs of shooting range SR with center Cd of display range DR, based on the position and size relation calculated in Step S120.

In Step S160, adjustment support device 16 (adjustment guide information creator 26) creates adjustment guide image Gi1 to show the operator the moving direction of shooting range SR calculated in Step S150.

In Step S170, adjustment support device 16 outputs adjustment guide image Gi1 created in Step S160 via projection display apparatus 12. More specifically, as shown in FIG. 6A, adjustment guide image Gi1 showing the moving direction of shooting range SR to the operator is displayed in display area DR. After displaying adjustment guide image Gi1, adjustment support device 16 returns to Step S110.

When adjustment support device 16 determines that center Cd of display range DR of projection display apparatus 12 is matched with center Cs of shooting range SR of imaging apparatus 14 in Step S130, adjustment support device 16 determines in Step S140 whether an area of display range DR of projection display apparatus 12 is a predetermined percentage (e.g., 80%) of an area of shooting range SR of imaging apparatus 14, based on the position and size relation calculated in Step S120. When the area satisfies the predetermined percentage, adjustment support device 16 proceeds to Step S180, and if not, to Step S190.

When adjustment support device 16 determines that the area of display range DR of projection display apparatus 12 is not the predetermined percentage of the area of shooting range SR of imaging apparatus 14 in Step S140, adjustment support device 16 (adjustment operation calculator 24) calculates in Step S190 the size change direction of shooting range SR, i.e., the size change direction for making the area of display range DR become the predetermined percentage of the area of shooting range SR, based on the position and size relation calculated in Step S120.

In Step S200, adjustment support device 16 (adjustment guide information creator 26) creates adjustment guide image Gi for showing the operator the size change direction of shooting range SR calculated in Step S190.

In Step S210, adjustment support device 16 outputs adjustment guide image Gi2 created in Step S200 via projection display apparatus 12. More specifically, as shown in FIG. 6B, adjustment guide image Gi2 that shows the operator the size change direction of shooting range SR is displayed in display range DR. After displaying adjustment guide image Gi2, adjustment support device 16 returns to S110.

When adjustment support device 16 determines that center Cd of display range DR of projection display apparatus 12 is matched with center Cs of shooting range Sr of imaging apparatus 14 in Step S130, and also determines that the area of display range DR is the predetermined percentage of the area of shooting range SR in Step S140 in Step S140, display range DR and shooting range SR satisfy the predetermined position and size relation. Then, in Step S180, adjustment support device 16 outputs via projection display apparatus 12 an adjustment completion image showing the operator that adjustment has been completed. In other words, the adjustment completion image is displayed in display range DR.

In the first exemplary embodiment as described above, the relation between display range DR of projection display apparatus 12 and shooting range SR of imaging apparatus 14 can be adjusted to achieve the predetermined position and size relation, regardless of specifications of imaging apparatus 14.

More specifically, the operator can adjust the imaging direction or zoom magnification of imaging apparatus 14 with reference to adjustment guide images Gi1 and Gi1 displayed in display range DR of projection display apparatus 12, i.e., without confirming an image shot by imaging apparatus 14. Accordingly, imaging apparatus 14 does not need to be designed to change the imaging direction or zoom magnification according to external signals. Still more, an imaging apparatus without monitor for displaying a shot image can also be adjusted to achieve the predetermined position and size relation between the display range of the projection display apparatus and the shooting range of the shooting range.

Second Exemplary Embodiment

In the above first exemplary embodiment, the adjustment guide information (adjustment guide image) shows the operator the moving direction and size change direction of the shooting range of the imaging apparatus, but not a moving amount or a size change amount. In the second exemplary embodiment, the moving amount and size change amount are shown to the operator as the adjustment guide information. The configuration of the second exemplary embodiment is substantially the same as that in the first exemplary embodiment, except for the operation of the adjustment support device.

The adjustment operation calculator of the adjustment support device in the second exemplary embodiment calculates the moving direction and size change direction of shooting range SR of imaging apparatus 14, same as adjustment operation calculator 24 of adjustment support device 16 in the first exemplary embodiment. Furthermore, the adjustment operation calculator in the second exemplary embodiment calculates a moving amount and a size change amount of shooting range SR, based on the position and size relation calculated by the position and size relation calculator. The moving amount of shooting range SR is, for example, a distance between center Cs of shooting range SR and center Cd of display range DR. The size change amount is, for example, an area ratio of target shooting range SR' relative to shooting range SR at the time of calculation when display range DR is a predetermined percentage of shooting range SR (the percentage when both ranges satisfy the target (predetermined) position and size relation).

The adjustment guide information creator of the adjustment support device in the second exemplary embodiment creates an adjustment guide image, based on the moving direction, moving amount, size change direction, and size change amount of shooting range SR of imaging apparatus 14 calculated by the adjustment operation calculator.

Figure 8A:
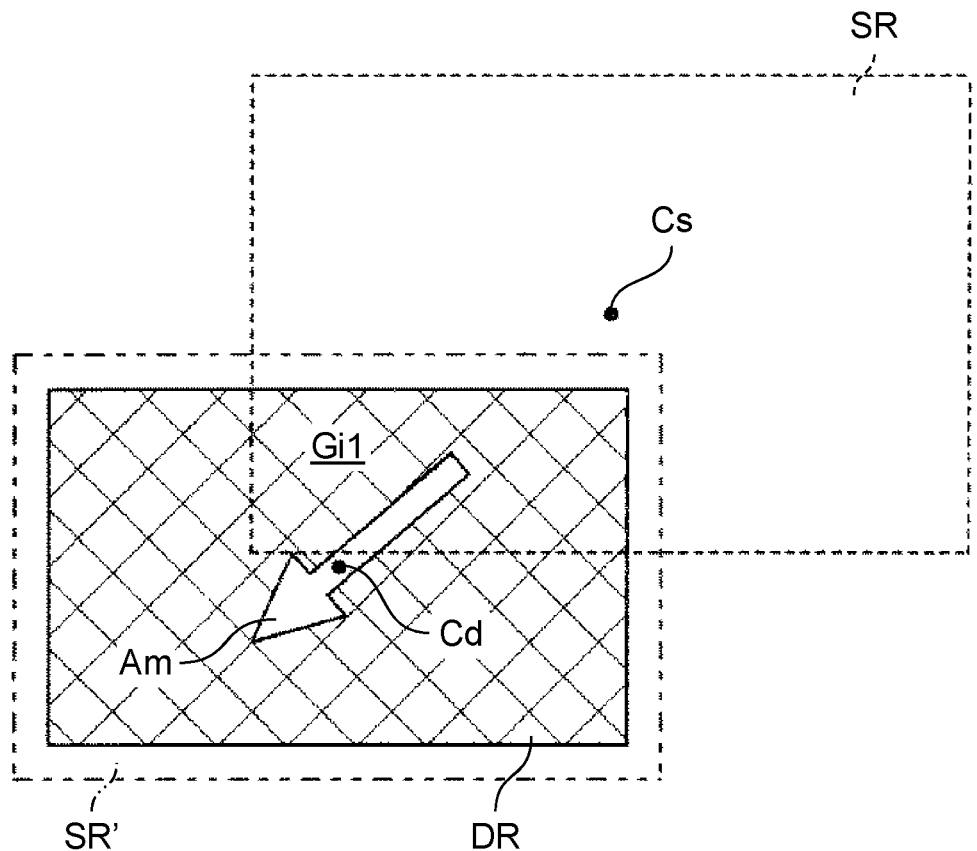
FIG. 8A to FIG. 8C are exemplary adjustment guide images that indicate a moving direction and a moving amount of a shooting range in accordance with a second exemplary embodiment of the present disclosure.
Figure 8B:
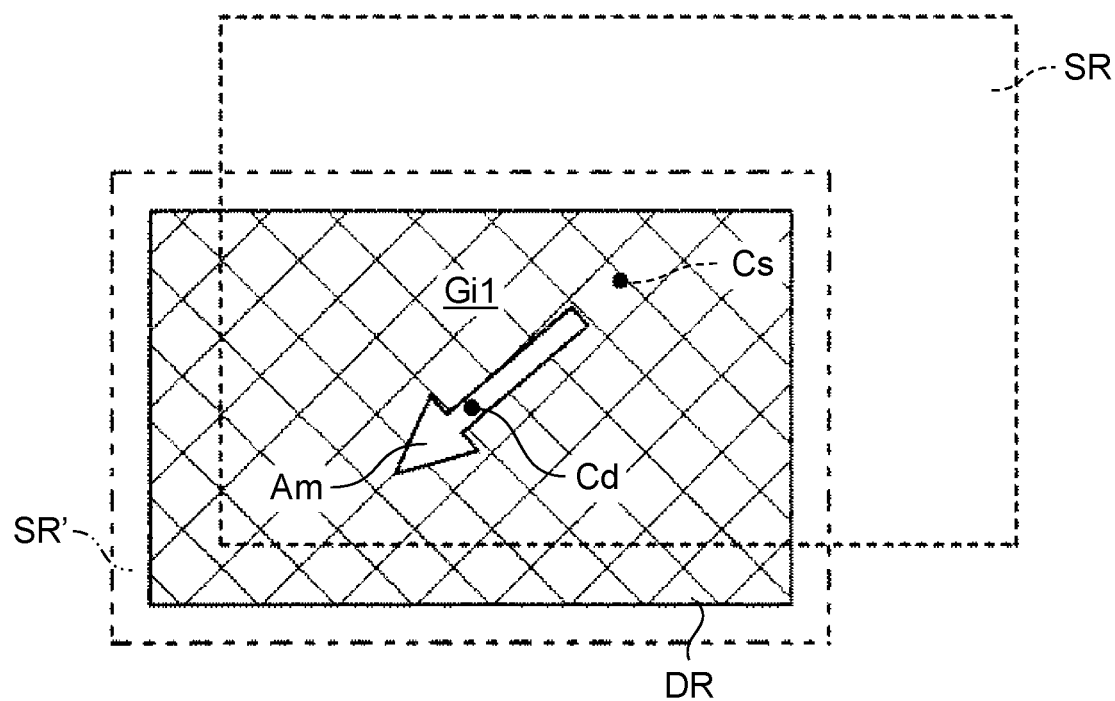
Figure 8C:
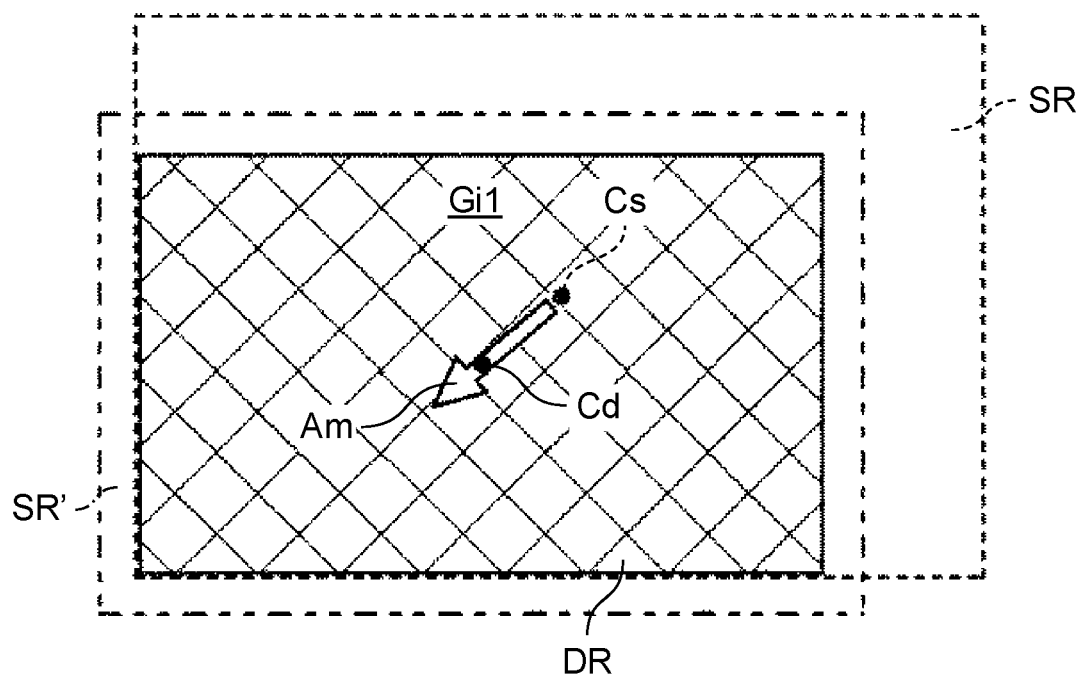
Figure 9A:
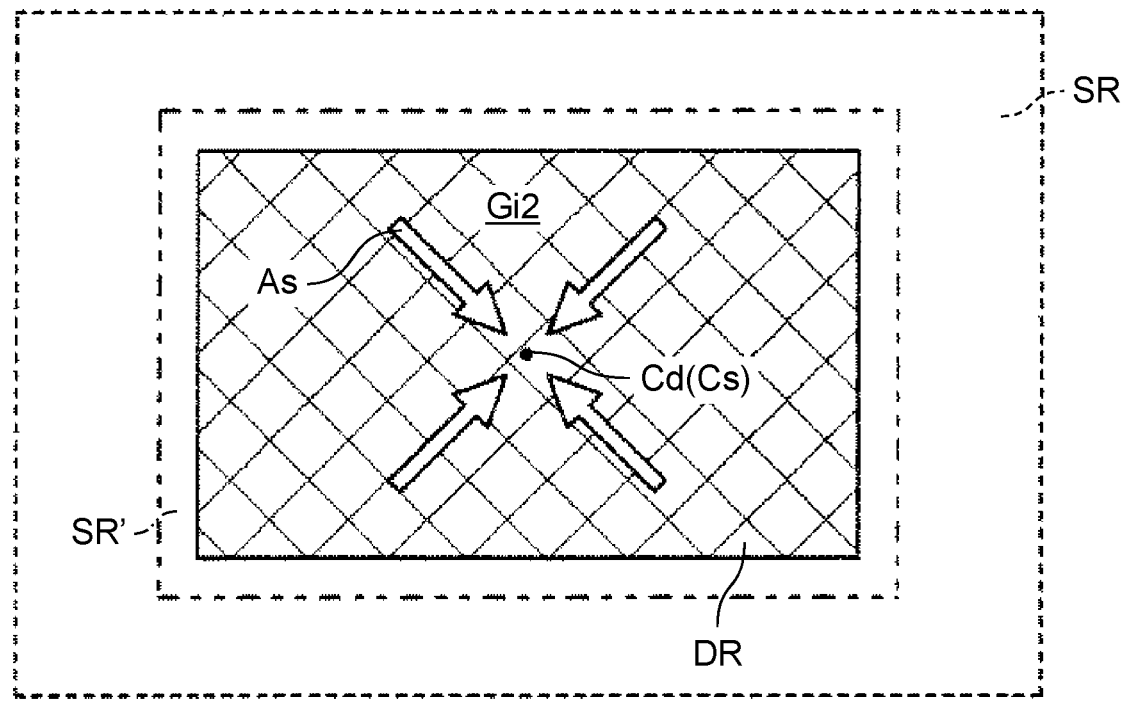
FIG. 9A to FIG. 9C are exemplary adjustment guide images that indicate a size change direction and a size change amount of the shooting range in accordance with the second exemplary embodiment of the present disclosure.
Figure 9B:
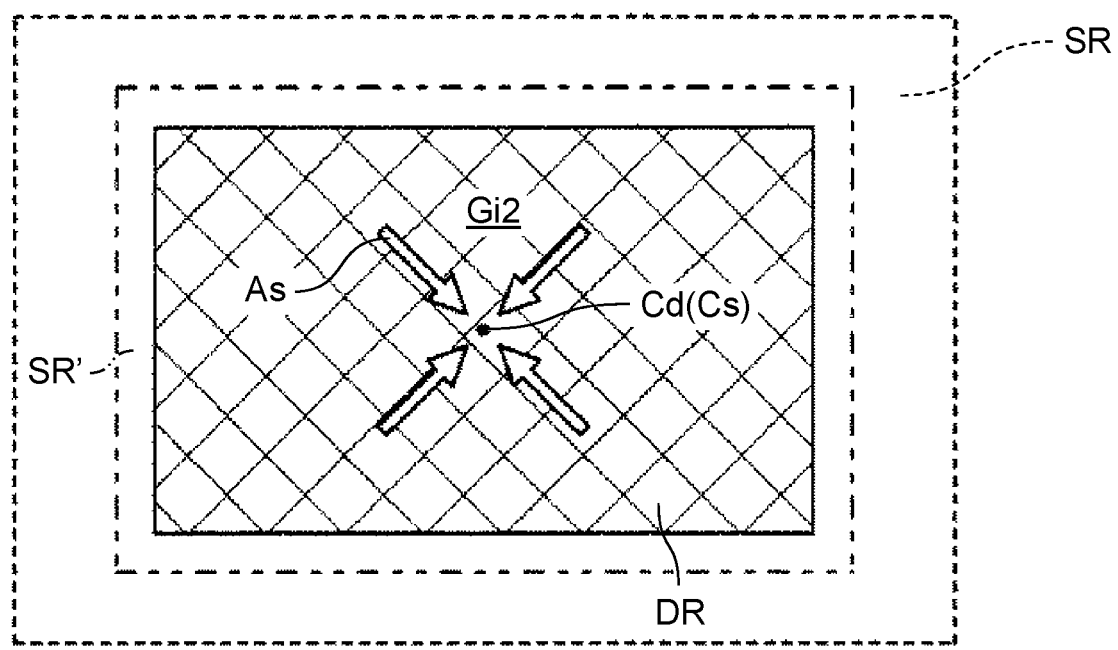
Figure 9C:
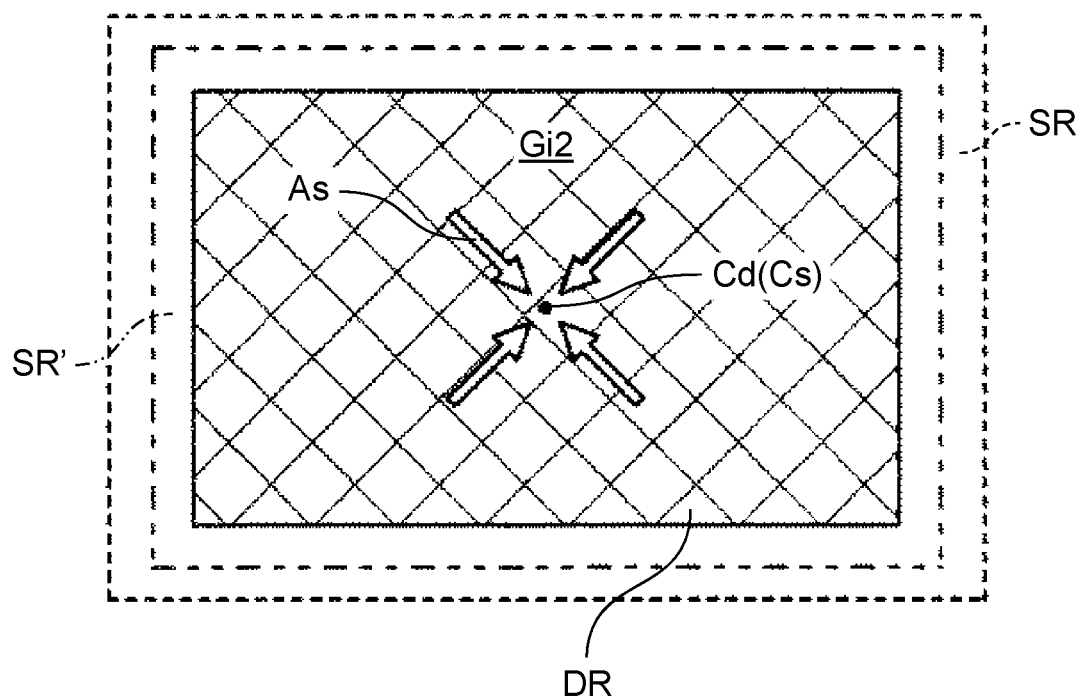

FIG. 8A to FIG. 8C shows examples of the adjustment guide image that indicate the moving direction and moving amount of the shooting range. FIG. 9A to FIG. 9C show examples of the adjustment guide image that indicate the size change direction and size change amount of the shooting range.

As shown in FIG. 8A to FIG. 8C, the size of arrow Am in adjustment guide image Gi1 is reduced as a distance between center Cs of shooting range SR and center Cd of display range DR becomes shorter. Accordingly, the operator can recognize by the reduced size of arrow Am that center Cs of shooting range SR is moving close to center Cd of display range DR.

As shown in FIG. 9A to FIG. 9C, the size of a plurality of arrows As is reduced as the area of shooting range SR becomes close to the target area of shooting range SR'. Accordingly, the operator can recognize by the reduced size of arrows As that the area of shooting range SR is becoming close to the target area of shooting range SR'.

Indication of the moving amount and size change amount of shooting range SR is not limited to a change of size of arrows Am and As. For example, arrows Am and As may indicate the moving amount and size change amount of shooting range SR by blinking intervals without changing their sizes. For example, blinking intervals of arrows Am and As may become shorter as the relation between shooting range SR and display range DR becomes close to the predetermined position and size relation.

The second exemplary embodiment as described above can also adjust the relation between display range DR of projection display apparatus 12 and shooting range SR of imaging apparatus 14 to achieve the predetermined position and size relation, regardless of specifications of imaging apparatus, same as the first exemplary embodiment.

Third Exemplary Embodiment

In the first and second exemplary embodiments, the operator installs imaging apparatus 14 to face display range DR as preparation so that at least a part of display range DR (pattern image Pi) of projection display apparatus 12 is included in shooting range SR of imaging apparatus 14, as shown in FIG. 4 and FIG. 5. However, this preparation may take time. In particular, it may take time also to adjust the position of imaging apparatus 14, unlike aforementioned first exemplary embodiment. This is because the operator may have difficulty in visually recognizing shooting range SR. For example, there may be no display itself connected to imaging apparatus 14 to show shooting range SR. Or, the operator may not be able to see a display while adjusting imaging apparatus 14, although the display is connected. The third exemplary embodiment makes this shooting range SR visually recognizable by the operator. The configuration of the third exemplary embodiment is substantially the same as the first exemplary embodiment, except for the operation of the adjustment support device.

The controller of the adjustment support device in the third exemplary embodiment includes a pattern image changer that at least partially changes pattern image Pi. The pattern image changer changes pattern image Pi based on the position and size relation calculated by the position and size relation calculator.

Figure 10A:
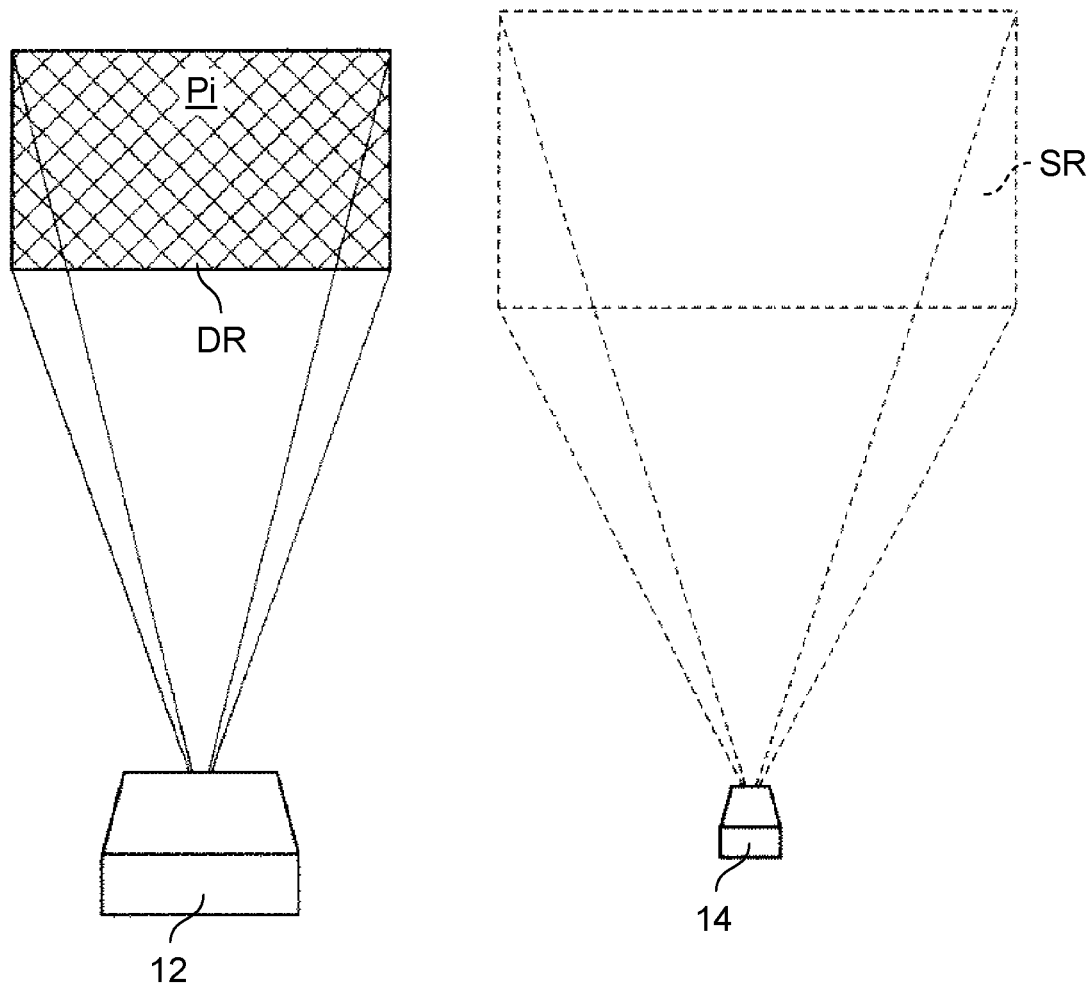
FIG. 10A is a pattern image present outside a shooting range of an imaging apparatus in accordance with a third exemplary embodiment of the present disclosure.
Figure 10B:
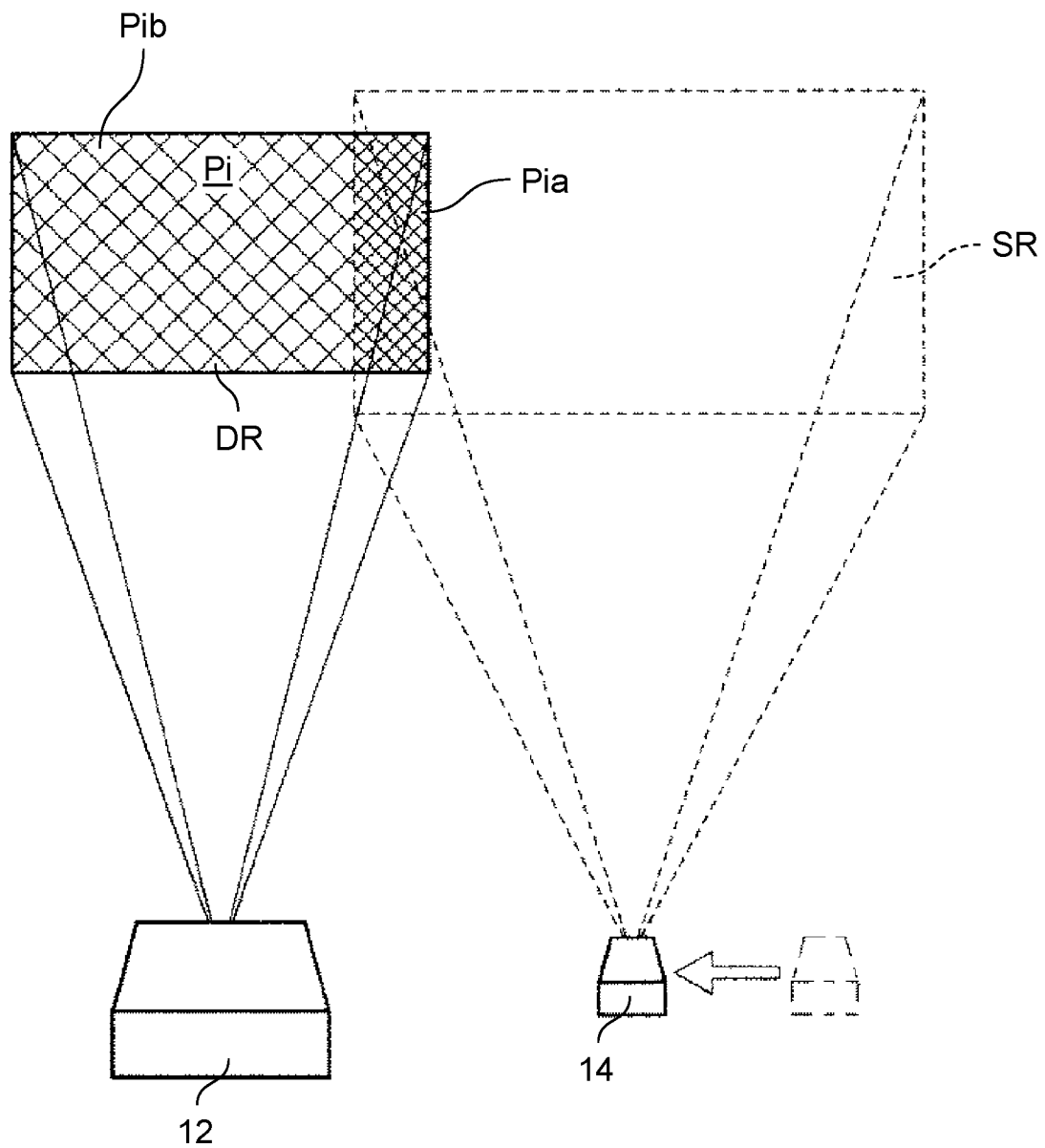
FIG. 10B is a pattern image partially present within a range of the imaging apparatus in accordance with the third exemplary embodiment of the present invention.

FIG. 10A shows a pattern image present outside the shooting range of imaging apparatus. FIG. 10B shows a pattern image partially included in the range of imaging apparatus.

As shown in FIG. 10A and FIG. 10B, when the operator moves imaging apparatus 14 and part Pia of pattern image Pi of projection display apparatus 12 enters shooting range SR, the pattern image changer of the adjustment support device in the third exemplary embodiment changes this part Pia. More specifically, the pattern image changer changes the pattern image such that part Pia and remaining part Pib present outside shooting range SR are visually distinguished. For example, pattern image Pi is changed to have different colors. Accordingly, the operator can recognize the position of shooting range SR.

The third exemplary embodiment described above can also adjust the relation between display range DR of projection display apparatus 12 and shooting range SR of imaging apparatus 14 to achieve the predetermined position and size relation, regardless of specifications of imaging apparatus, same as aforementioned first exemplary embodiment.

Other Exemplary Embodiments

The present disclosure is described with reference to the above first to third exemplary embodiments, but is not limited to these embodiments.

For example, the display apparatus in the first to third exemplary embodiments is projection display apparatus 12, such as a projector. However, the present disclosure is not limited to the projection display apparatus. The display apparatus may also be, for example, a large liquid crystal display.

Still more, in the first to third exemplary embodiments, the adjustment work by the operator is to adjust at least one of the position, imaging direction, and zoom magnification of imaging apparatus 14. However, the present disclosures is not limited to this adjustment work. Instead of adjusting imaging apparatus 14, the operator may adjust at least one of the position, projecting direction, and zoom magnification of projection display apparatus 12. Or, the operator may adjust both projection display apparatus 12 and imaging apparatus 14. Also, in these cases, embodiments of the present disclosure can adjust the display range and shooting range to achieve the predetermined position and size relation.

Still more, in the first exemplary embodiment, adjustment guide images Gi1 and Gi1, as shown in FIG. 6A and FIG. 6B, support the adjustment work by the operator and also include pattern image Pi for calculating the position and size relation between display range DR of projection display apparatus 12 and shooting range SR of imaging apparatus 14. However, the operator's adjustment work can be supported even if the adjustment guide image does not include the pattern image. In this case, for example, the adjustment support device changes the adjustment guide image (without pattern image) to the pattern image after the operator adjusts the position, imaging direction, and zoom magnification of the imaging apparatus by receiving the support of the adjustment guide image, i.e., after the position and size relation is changed. A new position and size relation is then calculated based on the pattern image. As a result, the projection display apparatus alternately displays the adjustment guide image (without pattern image) and pattern image.

Furthermore, the first to third exemplary embodiments support operator's work to adjust display range DR of single projection display apparatus 12 and shooting range SR of single imaging apparatus 14 to achieve the predetermined position and size relation. However, embodiments of the present disclosure are not limited to single unit.

Figure 11:
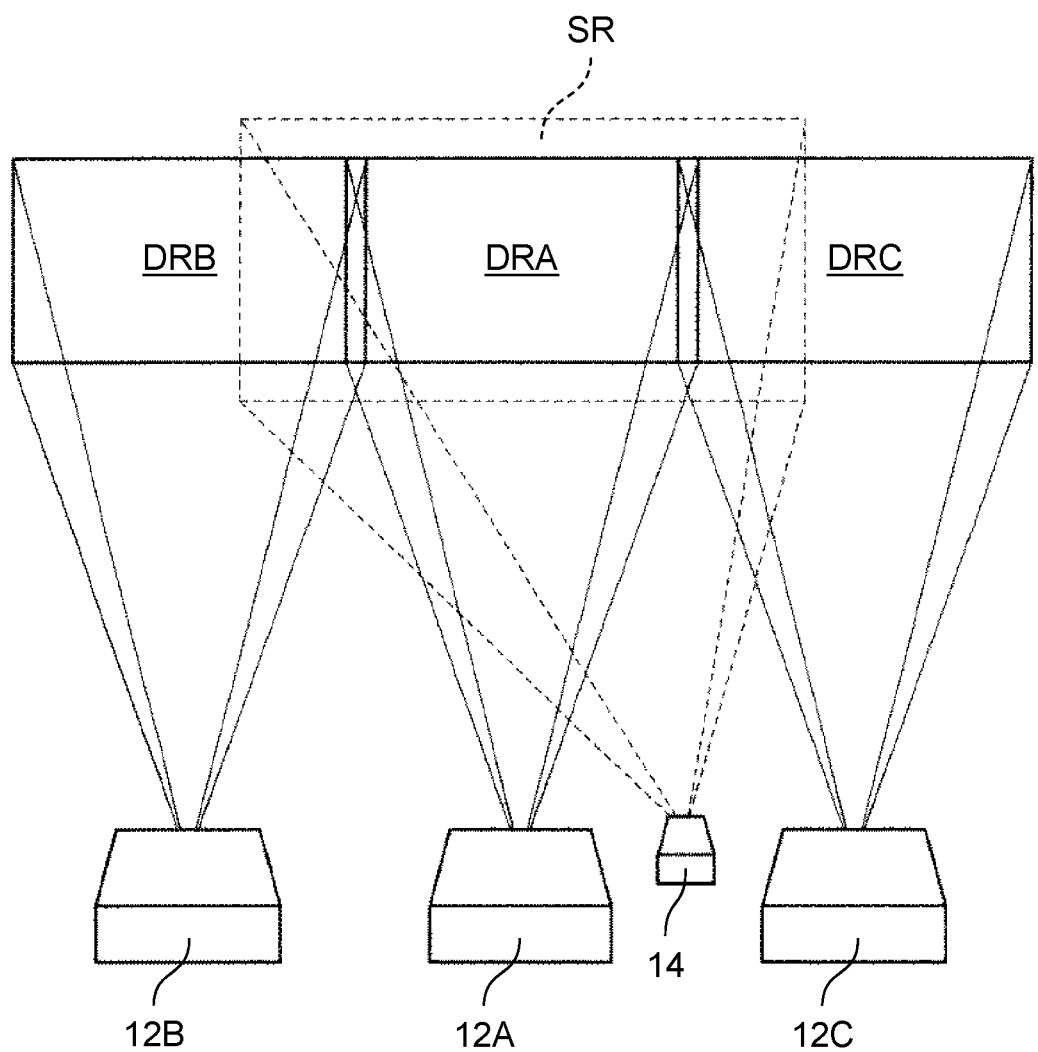
FIG. 11 illustrates display ranges of a plurality of display apparatuses whose position and size relative to a shooting range of single imaging apparatus are separately adjusted.

FIG. 11 shows display ranges of a plurality of display apparatuses whose position and size relations relative to the shooting range of single imaging apparatus are adjusted separately.

As shown in FIG. 11, display ranges DRA to DRC of projection display apparatuses 12A to 12C are partially overlapped. The left part of display range DRA of projection display apparatus 12A at the center is overlapped with the right part of display range DRB of projection display apparatus 12b on the left side. The right part of the display range DRA at the center is overlapped with the left part of display range DRC of projection display apparatus 12C on the right side. An overlapped amount of these display ranges DRA to DRC is, for example, 200 pixels. By using a plurality of projection display apparatuses 12A to 12C, larger images and video can be displayed, compared with single projection display apparatus.

Imaging apparatus 14 is used for monitoring an overlapping state of each of display ranges DRA to DRC of projection display apparatuses 12A to 12C. Accordingly, when shooting range SR of imaging apparatus 14 and each of display ranges DRA to DRC of projection display apparatuses 12A to 12C satisfy the predetermined position and size relation, entire display range DRA at the center, the right part of display range DRB, and the left part of display range DRC are included in shooting range SR.

In this case, projection display apparatus 12A at the center is first installed in an appropriate position, and its projecting direction and zoom magnification are appropriately adjusted. The operator adjusts the position and imaging direction of imaging apparatus 14, with the support of the adjustment support device, so that the center of display range DRA of projection display apparatus 12A at the center and the center of shooting range SR are matched (first adjustment).

Next, after the operator finishes the first adjustment, the operator adjusts, with the support of the adjustment support device, the positions, projecting directions, and zoom magnifications of projection display apparatuses 12B and 12C and zoom magnification of imaging apparatus 14 so that a predetermined percentage of display range DRB of left projection display apparatus 12B and a predetermined percentage of display range DRC of right projection display apparatus 12C are included in shooting range SR of imaging apparatus 14 (second adjustment).

Furthermore, the adjustment guide information that supports operator's work to adjust the display range of the display apparatus and the shooting range of the imaging apparatus to achieve the predetermined position and size relation is shown to the operator in the form of image in the aforementioned exemplary embodiments. However, embodiments of the present disclosure are not limited to images. For example, voice adjustment guide of information may be provided. For example, when the adjustment support device is a PC, the adjustment guide information may be output to the operator via a speaker installed in the PC.

The exemplary embodiments of the present disclosure provide, in a broad sense, the position and size adjustment support method that supports operator's adjustment work to achieve the predetermined position and size relation between the display range of the display apparatus and the shooting range of the imaging apparatus. At least a part of the display range is shot by the imaging apparatus, and the position and size relation between the display range and the shooting range is calculated based on the image shot by the imaging apparatus. Then, at least the moving direction or the size change direction of at least the display range or the shooting range is calculated, based on the position and size relation calculated, in order to change the relation between the display range and the shooting range to the predetermined position and size relation. The adjustment guide information on at least the moving direction calculated or size change direction calculated is created and output to provide the information to the operator.

As described above, the above embodiments are intended to describe technical aspects of the present disclosure. Drawings and detailed description are provided for this purpose. The drawings and detailed description include components that are illustrative and not essential for solving the disadvantage. Accordingly, components in the drawings and detailed descriptions should not be immediately recognized as essential.

The above exemplary embodiments are to be considered illustrative in all respects and all variations including changes, substitutions, additions, and omissions which come within the meaning of appended claims and range of equivalency of the claims are therefore intended to be embraced therein.

The present disclosure is applicable when an image in a display range of display apparatus, such as a projector and display, is shot by an imaging apparatus, such as a camera.

What is claimed is:

1. A position and size adjustment support method of supporting an adjustment work by an operator to achieve a predetermined position and size relation between a display range of a display apparatus and a shooting range of an imaging apparatus, the method comprising:

shooting an image of at least a part of the display range by the imaging apparatus;

calculating a position and size relation between the display range and the shooting range based on the image shot by the imaging apparatus, the position and size relation between the display range and the shooting range being (i) a relationship between a position of the display range and a position of the shooting range, and (ii) a relationship between a size of the display range and a size of the shooting range;

calculating at least one of a moving direction and a size change direction of at least one of the display range and the shooting range, based on the position and size relation calculated, the at least one of the moving direction and the size change direction being used to change the position and size relation between the display range and the shooting range to the predetermined position and size relation;

creating and outputting adjustment guide information providing the operator with the at least one of the moving direction and the size change direction calculated; and displaying a pattern image in the display range, wherein the adjustment guide information is an adjustment guide image, the adjustment guide image is displayed by the display apparatus, and when a part of the pattern image is present outside the shooting range, the part present outside the shooting range and a remaining part of the pattern image present inside the shooting range are displayed in a visually distinguishable manner.

2. The position and size adjustment support method of claim 1, further comprising:

calculating at least one of a moving amount and a size change amount of at least one of the display range and the shooting range, based on the position and size relation calculated, the at least one of the moving amount and the size change amount being used to change the position and size relation between the display range and the shooting range to the predetermined position and size relation, wherein the adjustment guide image is created to provide the operator with the at least one of the moving amount and the size change amount calculated.

3. The position and size adjustment support method of claim 1, further comprising:

updating the adjustment guide image when the position and size relation between the display range and the shooting range changes by the adjustment work, the updating being executed based on the position and size relation changed.

4. The position and size adjustment support method of claim 1, further comprising:

displaying an adjustment completion image by the display apparatus, the adjustment completion image informing completion of adjustment when the display range and the shooting range satisfy the predetermined position and size relation by the adjustment work.

5. The position and size adjustment support method of claim 1, wherein when the display range and the shooting range satisfy the predetermined position and size relation, a whole of the display range is included in the shooting range.

6. The position and size adjustment support method of claim 1, wherein the display apparatus is a projection display apparatus that projects an image, and the display range is a projection range for projecting the image.

7. A position and size adjustment support method of supporting an adjustment work by an operator to achieve a predetermined position and size relation between a display range of a display apparatus and a shooting range of an imaging apparatus, the method comprising:

shooting an image of at least a part of the display range by the imaging apparatus;

calculating a position and size relation between the display range and the shooting range based on the image shot by the imaging apparatus, the position and size relation between the display range and the shooting range being (i) a relationship between a position of the display range and a position of the shooting range, and (ii) a relationship between a size of the display range and a size of the shooting range;

calculating at least one of a moving direction and a size change direction of at least one of the display range and the shooting range, based on the position and size relation calculated, the at least one of the moving direction and the size change direction being used to change the position and size relation between the display range and the shooting range to the predetermined position and size relation; and creating and outputting adjustment guide information providing the operator with the at least one of the moving direction and the size change direction calculated, wherein when the display range and the shooting range satisfy the predetermined position and size relation, a whole of the display range is included in the shooting range, and when the display range and the shooting range satisfy the predetermined position and size relation, a center of the shooting range and a center of the display range match and an area of the display range is a predetermined percentage of an area of the shooting range.

8. A position and size adjustment support device that supports an adjustment work by an operator to achieve a predetermined position and size relation between a display range of a display apparatus and a shooting range of an imaging apparatus, the device comprising:

a storage that stores a program; and a controller that controls the position and size adjustment support device by executing the program, wherein the controller:

obtains an image shot by the imaging apparatus, the image including at least a part of the display range of the display apparatus, calculates a position and size relation between the display range and the shooting range based on the image shot by the imaging apparatus, the position and size relation between the display range and the shooting range being (i) a relationship between a position of the display range and a position of the shooting range, and (ii) a relationship between a size of the display range and a size of the shooting range, calculates at least one of a moving direction and a size change direction of at least one of the display range and the shooting range, based on the position and size relation calculated, the at least one of the moving direction and the size change direction being used to change the position and size relation between the display range and the shooting range to the predetermined position and size relation, creates and outputs adjustment guide information providing the operator with the at least one of the moving direction and the size change direction calculated, and causes a pattern image to be displayed in the display range, wherein the adjustment guide information is an adjustment guide image, the adjustment guide image is displayed by the display apparatus, and when a part of the pattern image is present outside the shooting range, the part present outside the shooting range and a remaining part of the pattern image present inside the shooting range are displayed in a visually distinguishable manner.

9. A position and size adjustment support device that supports an adjustment work by an operator to achieve a predetermined position and size relation between a display range of a display apparatus and a shooting range of an imaging apparatus, the device comprising:

a storage that stores a program; and a controller that controls the position and size adjustment support device by executing the program, wherein the controller:

obtains an image shot by the imaging apparatus, the image including at least a part of the display range of the display apparatus, calculates a position and size relation between the display range and the shooting range based on the image shot by the imaging apparatus, the position and size relation between the display range and the shooting range being (i) a relationship between a position of the display range and a position of the shooting range, and (ii) a relationship between a size of the display range and a size of the shooting range, calculates at least one of a moving direction and a size change direction of at least one of the display range and the shooting range, based on the position and size relation calculated, the at least one of the moving direction and the size change direction being used to change the position and size relation between the display range and the shooting range to the predetermined position and size relation, and creates and outputs adjustment guide information providing the operator with the at least one of the moving direction and the size change direction calculated, wherein when the display range and the shooting range satisfy the predetermined position and size relation, a whole of the display range is included in the shooting range, and when the display range and the shooting range satisfy the predetermined position and size relation, a center of the shooting range and a center of the display range match and an area of the display range is a predetermined percentage of an area of the shooting range.

* * * * *